(12) United States Patent
Sheely (10) Patent No.: US 7,056,844 B2
(45) Date of Patent: Jun. 6, 2006

(54) TRANSPARENT REINFORCED TAPE

(75) Inventor: Jeffrey D. Sheely, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 256 days.

(21) Appl. No.: 10/024,311

(22) Filed: Dec. 17, 2001

(65) Prior Publication Data

US 2003/0114056 A1    Jun. 19, 2003

(51) Int. Cl.
B32B 27/04    (2006.01)

(52) U.S. Cl. ............... 442/58; 442/20; 442/38; 442/43; 442/45; 442/46; 442/49; 442/50; 442/54; 442/149; 428/357; 428/364; 428/365; 428/368; 428/397

(58) Field of Classification Search .......... 442/50, 442/54, 58, 20, 38, 43, 45, 46, 49, 149; 428/357, 428/364, 365, 368, 399
See application file for complete search history.

(56) References Cited

U.S. PATENT DOCUMENTS

| 3,179,552 A | 4/1965 | Hauser et al. |
| 4,188,442 A | 2/1980 | Asakura et al. |
| 4,636,427 A | 1/1987 | Ohno et al. |
| 5,283,117 A | 2/1994 | Arai et al. |
| 5,407,726 A * | 4/1995 | Serra et al. ............ 428/161 |
| 5,804,610 A | 9/1998 | Hamer et al. |
| 5,902,654 A | 5/1999 | Davidson et al. |
| 6,331,343 B1 * | 12/2001 | Perez et al. ............ 428/141 |

FOREIGN PATENT DOCUMENTS

| EP | 0 381 366 B1 | 8/1990 |
| EP | 0 528 563 A2 | 2/1993 |
| JP | 05-140838 | 6/1993 |
| JP | 05-186749 | 7/1993 |
| WO | WO 01/83632 A2 | 11/2001 |
| WO | WO 01/83632 A3 | 11/2001 |

* cited by examiner

Primary Examiner—Ula Ruddock
(74) Attorney, Agent, or Firm—William L. Huebsch (57) ABSTRACT

The present invention provides a reinforced tape including a visually transparent backing layer, a reinforcing scrim preferably of fibers made of visually transparent material along one surface of the backing, and a layer of transparent adhesive covering but not totally wetting the reinforcing scrim so that the scrim is visible along the backing layer before the tape is applied to give a user a visual indication of the strength of the tape. The indexes of refraction of the material of the fibers in the scrim and of the adhesive are similar so that when the layer of adhesive is pressed against a substrate through the backing layer, the adhesive will more totally wet the fibers of the reinforcing scrim, causing them to become significantly less visible in the reinforced tape adhered to the substrate.

12 Claims, 4 Drawing Sheets

TRANSPARENT REINFORCED TAPE

FIELD OF THE INVENTION

The present invention relates to reinforced adhesive coated tapes particularly including those called duct tapes which comprise a backing layer of polymeric material, a reinforcing scrim along a major surface of the backing layer, and a layer of adhesive along that major surface of the backing layer that covers the reinforcing scrim.

BACKGROUND OF THE INVENTION

Well known in the art are reinforced adhesive coated tapes including those called duct tapes which comprise a backing layer of polymeric material, a reinforcing scrim along a major surface of the backing layer, and a layer of adhesive along that major surface of the backing layer that covers the reinforcing scrim. The scrim provides reinforcing for the backing layer, and can be of non-woven fibers, or can be a rectangular grid formed of spaced fibers or bundles of fibers extending longitudinally along the backing layer interwoven with spaced fibers or bundles of fibers extending transverse of the backing layer. Such a rectangular grid restricts manual tearing of the tape to tears in either the transverse or the longitudinal direction, which is useful so that a rectangular portion can be torn out of the tape. Typically the adhesive for such reinforced tapes is a visually apparent pressure sensitive adhesive and is applied in a heavy layer so that it will conform and adhere to substrates of many different materials having many different surface textures. Thus such reinforced tapes have found many more uses than sealing the joints in ventilating ducts. Such reinforced tapes are available with backing layers of many different colors so that, for example, a tape of a color at least similar to that of the substrate on which it is to be applied can be used to help retain an appearance for the taped substrate that is as pleasing as possible, or a tape of a contrasting color can be applied to make the tape stand out.

One variation of the reinforced tape structure described above has been provided by extruding or laminating the polymeric backing layer of the tape onto the reinforcing scrim, causing the backing layer to form around and envelope the fiber bundles in the scrim, and then applying a layer of pressure sensitive adhesive to one surface of the backing layer. The backings of such reinforced tapes typically have depressions along their outer surfaces opposite the layer of pressure sensitive adhesive corresponding to spaces between intersecting bundles of fibers in their reinforcing scrims, so that the outer surfaces of the tapes have less pleasing appearance than may be desired for some purposes.

Also well known are adhesive coated tapes of a type called box sealing tapes that typically have a polymeric backing layer and a layer of pressure sensitive adhesive along one major surface of that backing layer, but which do not include a reinforcing scrim of the type described above. Both the backing and adhesive of such tapes have been made quite visually transparent which helps to retain an appearance for a substrate to which the tapes are applied that is as pleasing as possible; however, many of their backing layers either do not provide the strength that is provided by backing layers with reinforcing scrims, or, if they have such strength, will stretch before they break and can not be accurately torn by hand. Special treatment of some such backing layers can be provides so that they can be torn by hand, but such tearing typically occurs in only one straight direction.

One type of box sealing tape called "filament tape" does include fiberglass reinforcing fibers or reinforcing ribs along its backing, however those reinforcing fibers or ribs in that tape are easily seen so that the backing of the "filament tape" is not very transparent and has little tendency to become visually transparent when applied to a substrate, and the "filament tape" is very difficult to tear by hand.

DISCLOSURE OF THE INVENTION

The present invention provides a tape including a visually transparent polymeric backing layer and a visually transparent layer of pressure sensitive adhesive that also includes a reinforcing scrim. The reinforcing scrim is visually apparent in the tape before the tape is applied to assure a user of the type and strength of the tape, but becomes significantly less visually apparent when the transparent reinforced tape is applied to a substrate to retain an appearance for that substrate which is as pleasing as possible after the tape is applied.

The reinforcing scrim in the tape according to the present invention is formed of fibers that preferably are of visually transparent material and is positioned along a major surface of the backing layer. The layer of transparent adhesive extends along that major surface of the backing layer and covers, but does not totally wet all of the surfaces of the fibers forming the reinforcing scrim so that the non-wetted surfaces of the fibers are visible, making the reinforcing scrim at least partially visible along the backing layer. The material from which the fibers and the transparent adhesive are made have similar indexes of refraction. When the layer of adhesive is pressed against a substrate through the backing layer, the adhesive will more totally wet the surfaces of the fibers in the reinforcing scrim. This will cause the scrim to become significantly less visible or visually apparent than before the reinforced tape was pressed against and adhered to the substrate, thereby significantly reducing the visibility of the length of reinforced tape on the substrate.

The visually transparent backing layer of polymeric material should have a smooth major surface opposite the major surface bearing the reinforcing scrim and the layer of adhesive and, for some embodiments of the reinforcing tape, should be capable of being easily hand torn either longitudinally or transversely with respect to the length of the tape when stabilized by certain configurations of the reinforcing scrim that can also be torn by hand. A backing layer of low-density polyethylene having a thickness generally in the range of about 0.0004 to 0.012 inch or 0.001 to 0.030 cm, preferably in the range of about 0.0005 to 0.010 inch or 0.001 to 0.025 cm, and most preferably in the range of about 0.001 to 0.008 inch or 0.003 to 0.020 cm has been found to have these properties.

The adhesive for the reinforced tape should be generally transparent when adhered to a substrate, and must be capable of firmly adhering to substrates of many different materials (e.g., plastic, cardboard, rubber, glass, metal, wood, concrete, paint, and flexible materials such as fiberglass fabric, tarpaulins, and other fabrics). When the adhesive is one of those indicated in the following paragraph, the layer of transparent adhesive should be at a coating weight generally in the range of 5 to 60 grains per 24 square inches or 21 to 252 grams per square meter, should preferably be in the range of about 10 to 50 grains per 24 square inches or 42 to 210 grams per square meter, and should most preferably be in the range of about 20 to 35 grains per 24 square inches or 84 to 147 grams per square meter.

The material from which the fibers in the reinforcing scrim are made should have an index of refraction similar to that of the adhesive (i.e., the index of refraction of the fibers should be within plus or minus 0.2 of the index of refraction of the adhesive). As examples, the materials (having their approximate indexes of refraction or range of indexes of refraction shown in parentheses) fiberglass (1.52), acetate (1.479), acrylic (1.517), modacrylics (1.54), rayon (1.52–1.55), cotton (1.53–1.58), polyethylene (1.57), polypropylene (1.523), nylon (1.52–1.575), polyester (1.53–1.70), polyamine (1.67–1.8), and Kevlar (1.64) have been, for example, found suitable for use in making reinforcing scrims used with the pressure sensitive adhesives having an index of refraction of about 1.47 that are described in U.S. Pat. Nos. 5,804,610 and 5,902,654 (the content of which patents is hereby incorporated herein by reference), or any of the pressure sensitive adhesives having an index of refraction of about 1.51 that are commercially designated "Kraton" (trade mark) and are commercially available from Kraton Polymers U.S. LLC, Houston, Tex.

Fibers used to make the reinforcing layer can be individual or in bundles, and those fibers and/or bundles of fibers can be randomly disposed to form a non-woven reinforcing layer, or can be disposed in a rectangular pattern with space between the fibers or bundles to form a reinforcing layer that can be manually broken at the intersections between the woven fibers or bundles when the backing layer is torn to guide straight line tearing of the tape in either of two directions at right angles to each other. When the fibers are in bundles they should be disposed so that they can easily be wetted by the adhesive (i.e., fibers in bundles that are twisted, knitted, tacked at close intervals or are in non-woven layers have been found to be more difficult to wet than when the fibers are loosely laid in the bundles) and should have diameters that are sufficiently small so that almost all of the fibers in the bundles will be wetted by the adhesive when the tape is applied to a substrate. The deniers of the individual fibers in bundles of fibers forming the scrim should generally be in the range of about 0.10 to 15 denier, should preferably be in the range of about 0.75 to 10 denier, and should most preferably be in the range of about 1 to 5 denier; and the total of the deniers of the individual fibers in the bundles should generally be less than about 500, should preferably be less than about 300, and should most preferably be less than about 250.

The reinforcing scrim in the reinforced tape according to the present invention should be easily seen in the tape before it is applied to a substrate, and should become significantly less visible in the tape when the tape is adhered to a substrate, leaving a tape on the substrate in which the scrim is not highly visible. Based on the test procedures described below on the test sample indicated which measures the percent diffuse light reflected by a sample of the tape that is not adhered to a substrate from a 380 nm–780 nm light source, and then measures the percent diffuse light reflected by that sample of the tape after it is adhered to a transparent substrate from that same 380 nm–780 nm light source, the percentage of the light reflected as diffuse light by the tape sample before it is adhered to a substrate should be at least 15 percent to provide good visibility of the scrim, (that percentage of the light reflected as diffuse light being more acceptable when it is at least 18 percent, and being preferred when it is at least 20 percent). The percentage of the light reflected as diffuse light by the tape sample after it is adhered to a substrate should be less than 15 percent so that the scrim is not easily apparent in the applied tape, (that percentage of the light reflected as diffuse light being more acceptable when it is less than 10 percent, and being preferred when it is less than 5 percent). The reduction in the percentage of the light reflected as diffuse light by the tape sample when it is adhered to a substrate compared to when it is not adhered, which is mostly caused by the reduction in visibility of the scrim, should be at least 10 percent, and is more acceptable when it is at least 40 or 60 percent (with even higher percent reductions being preferred) so that the scrim almost entirely disappears and it is difficult to see the tape on the substrate.

BRIEF DESCRIPTION OF THE DRAWING

The present invention will be further described with reference to the accompanying drawing wherein like reference numerals refer to like parts in the several views, and wherein.

DETAILED DESCRIPTION

Figures 1, 2:
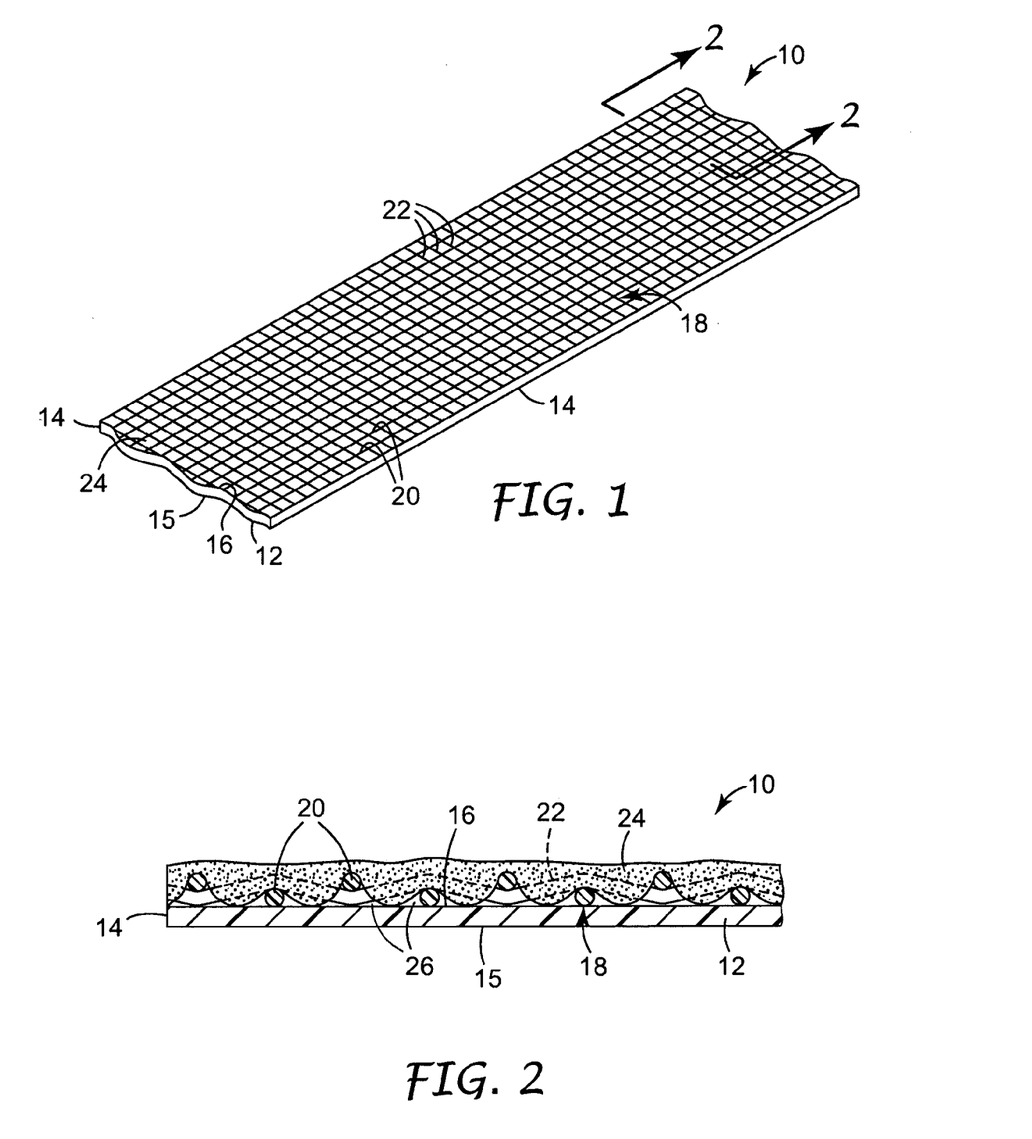
FIG. 1 is a perspective view of a first embodiment of transparent reinforced tape according to the present invention.
FIG. 2 is an enlarged fragmentary view taken approximately along the line 2—2 of FIG. 1.

Referring now to FIGS. 1 and 2 of the drawing, there is shown a first embodiment of a length of transparent reinforced tape according to the present invention generally designated by the reference numeral 10.

Generally, the length of reinforced tape 10 comprises an elongate visually transparent backing layer 12 of polymeric material (e.g., a film of clear low density polyethylene) having opposite longitudinally extending edges 14 and opposite first and second major surfaces 15 and 16. A reinforcing scrim 18 extends along the second major surface 16 of the backing layer 12 and is covered by a layer 24 of pressure sensitive adhesive along the second surface 16 of the backing layer 12.

The reinforcing scrim 18 is formed of bundles of fibers 20 made of a material with a refractive index close to that of the pressure sensitive adhesive in the layer 24, which material from which the fibers 20 are made is preferably visually transparent, although the fibers 20 have rough and/or irregular outer surfaces so that a person can not readily see through the fibers 20 when they are surrounded by air. The bundles of fibers 20 extend longitudinally along the backing layer 12 and are uniformly transversely spaced between the longitudinal edges 14 of the backing layer 12 (e.g., bundles of polyester fibers 20, each fiber being about 5 denier in size, and each bundle of fibers 20 totaling about 40 denier, which bundles are spaced at less than about 25 bundles per inch or 10 bundles per cm and preferably are spaced at less than about 15 bundles per inch or 6 bundles per cm between the longitudinal edges 14 of the backing layer 12). The bundles of fibers 20 are interwoven with bundles of fibers 22 of the same material and having the same structure described above for the fibers 20, which bundles of fibers 22 extend transverse of the backing layer 12 at right angles to its edges 14 and are uniformly spaced longitudinally along the backing layer 12 (e.g., bundles of polyester fibers 22, each fiber 22 being about 5 denier in size, and each bundle of fibers 22 totaling about 150 denier, which bundles are spaced at less than about 15 bundles per inch or 6 bundles per cm and preferably are spaced at less than about 10 bundles per inch or 4 bundles per cm (e.g., about 7 bundles per inch or 2.8 bundles per cm) longitudinally along the backing layer 12). The larger numbers of bundles of fibers 20 and 22 per inch or cm indicated above provide greater strength for the reinforced tape 10 and generally a straighter tear, whereas the smaller numbers afford less visibility of the scrim 18 in the reinforced tape 10 after it is adhered to a substrate.

Figure 3:
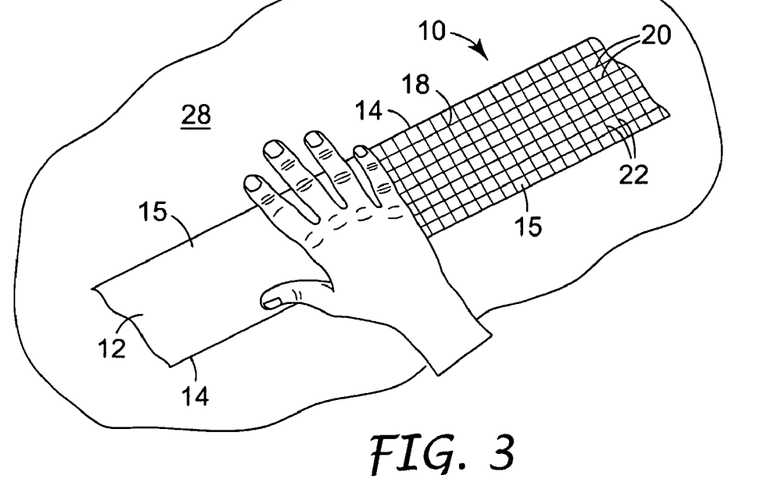
FIG. 3 is a perspective view of the length of transparent reinforced tape of FIG. 1 being adhered to a substrate.

The layer 24 of adhesive along the second major surface 16 of the backing layer 12 that covers the reinforcing scrim 18 is visually transparent when adhered between substrates. Some portions of the surfaces of the fibers 20 in the scrim 18 are only partially wetted by the adhesive (i.e., at least portions of the surfaces of individual fibers 20 or 22 in the scrim 18 adjacent the backing layer 12 are not totally wetted, leaving air spaces 26 (see FIG. 2) between the surfaces of some fibers 20 or 22 in the scrim 18 and the backing layer 12 and/or around at least portions of some of the individual fibers 20 or 22 in the scrim 18) so that those un-wetted rough or irregular surface portions of the fibers 20 scatter light and are visible (together with the air spaces) along the backing layer 12 to give a user of tape visual indication and assurance of the type and strength of the tape 10 and that it can be manually torn along straight lines in both directions. The material from which the fibers 20 and 22 in the scrim 18 are formed and the layer 24 of transparent adhesive have similar indexes of refraction (e.g., an index of refraction for the material of the fibers 20 and 22 in the scrim 18 that is within plus or minus 0.2 of the index of refraction of the adhesive in the layer 24 of transparent adhesive), and the fibers 20 and 22 in the scrim 18 are sized (e.g., the individual deniers of the fibers 20 or 22 in the bundles forming the scrim total less than about 300) and are disposed (e.g., the fibers 20 or 22 in the scrim 18 are loosely laid) so that upon applying force to the backing layer 12, as with ones hand as is illustrated in FIG. 3, to press the layer 24 of adhesive against a substrate 28, the adhesive in the layer 24 will sufficiently wet the previously un-wet surface portions of fibers 20 and 22 in the reinforcing scrim 18 to cause the fibers 20 and 22 to become significantly less visible than they were before the reinforced tape 10 was adhered to the substrate 28, so that the length of reinforced tape 10 (particularly including the scrim 18) becomes significantly more visually transparent after it is adhered to the substrate 28 than it was before it was adhered to the substrate 28.

Figure 4:
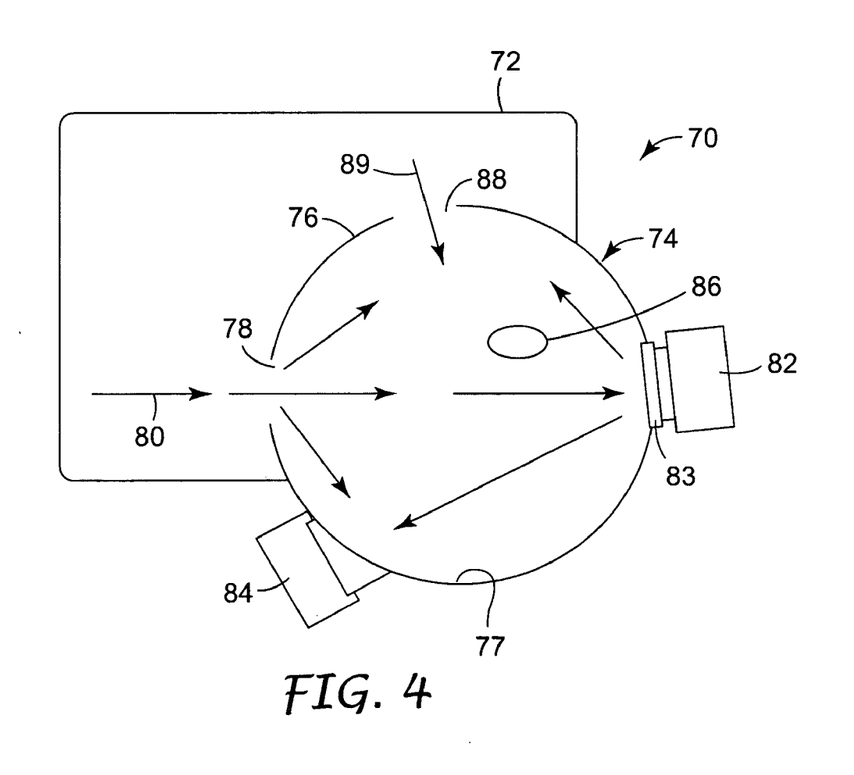
FIG. 4 is a schematic view of test equipment used to test certain aspects of the transparent reinforced tape according to the present invention.

Test equipment 70 schematically illustrated in FIG. 4 was used to determine the percentage of a predetermined amount of light directed toward a specific sample of the first embodiment of the reinforcing tape according to the present invention that was reflected from that sample as reflected diffuse light both before that sample was adhered to a substrate (called RDLb hereinafter), and after it was adhered to a transparent substrate (called "RDLa" hereinafter). That percentage of the predetermined amount of light directed toward the sample that was reflected from the sample as reflected diffuse light indicates the ease with which the sample can be seen on the substrate (i.e., if that percentage was 100 percent, the substrate would not be visible through the tape, and if that percentage was 0 percent (which is virtually impossible) the tape would be essentially invisible on the substrate). From these RDLb and RDLa values the percent reduction in the amount of reflected diffuse light reflected from the tape sample caused by adhering it to a substrate was calculated using the formula:

$$\text{Reduction \%} = ((RDLb - RDLa)/RDLb) \times 100\%$$

While some of the percent reduction in the amount of reflected diffuse light reflected from the tape sample caused by adhering it to a substrate was a result of adhesion of the layer of adhesive to that substrate, the majority is caused by the adhesive more completely wetting the scrim in the tape sample after it is adhered to the substrate.

The test equipment 70 included a spectrophotometer 72 that is commercially identified as a "Perkin Elmer Lambda 19—#506583, Serial No. 1140, to which is attached a lab sphere assembly including a lab sphere 74 commercially identified as a "Lab Sphere RSA-PE-19a Integrating Sphere, Serial No. 001527", both of which were manufactured by Perkin Elmer Instruments Sheton, Conn. The lab sphere assembly 74 included a hollow sphere 76 having a specularly light reflective inner surface 77, having a port 78 through which the spectrophotometer 72 directs a sample beam 80 of light along a path diametrically across the sphere 74, a first black light trap 82 opposite that portion 78 aligned to receive the sample beam 80 of light traveling along that path, a clear glass plate 83 on which a tape sample may be supported across the entrance to the first black light trap 82 either un-adhered or adhered to a surface of the glass plate 83, a second black light trap 84 disposed to receive light specularly reflected from the tape sample on the plate 83 at an angle of 16 degrees with respect to the light path from the portion 78 of the sphere 76 to the first black light trap 82, and a sensor 86 that senses the amount of reflected diffuse light within the sphere 76. The sphere 76 also has a port 88 through which the spectrophotometer 72 directs a reference beam of light 89 that is used for calibration purposes.

The test equipment 70 was operated in accordance with A.S.T.M. test procedure D 1003-00 (Procedure B), entitled "Standard Test Method for Haze and Luminous Transmittance of Transparent Plastics" (the content whereof is hereby incorporated herein by reference) using the following test parameters:

| Data recorded from 380 nm to 780 nm. | |
|---|---|
| Light Source: | CIE Source C |
| Scan Speed: | 240 nm/minute |
| Data Interval: | 1.0 nm |
| Slit width: | 4.25 nm |
| Smooth: | 6.00 nm/data pt |
| Mode(s): | %T; %R |

A sample of the reinforced tape 10 described above with reference to FIGS. 1 and 2 was tested in which the visually transparent backing layer 12 was of 0.002 inch or 0.005 cm thick clear or visually transparent low density polyethylene; the reinforcing scrim 18 included bundles of fibers 20 made of multifilament polyester (which has an index of refraction of about 1.53). Each fiber 20 was about 5 denier in size, and each bundle of fibers 20 totaled about 40 denier. The bundles of fibers 20 extended longitudinally along the backing layer 12 and were uniformly transversely spaced at about 25 bundles per inch or 9.8 bundles per cm between the longitudinal edges 14 of the backing layer 12. The reinforcing scrim 18 also included bundles of fibers 22 made of multifilament polyester. Each fiber 22 was about 5 denier in size, and each bundle of fibers 22 totaled about 150 denier. The bundles of fibers 22 extended transverse of the backing layer 12 at right angles to its edges 14 and were uniformly spaced at about 7 bundles per inch or 2.8 bundles per cm longitudinally along the backing layer 12. The layer 24 of adhesive was a 30 to 35 grains per 24 square inch area or 114.4 to 133.5 grams per square meter area layer 24 of the visually transparent pressure sensitive adhesive described in U.S. Pat. Nos. 5,804,610 and 5,902,654 (which has an index of refraction of about 1.47) along the second major surface 16 of the backing layer 12 and covering the reinforcing scrim 18. For this sample the RDLb was found to be about 15.8% and the RDLa was found to be about 6.4% giving a reduction % of about 59.3%. It was observed that the reinforcing scrim 18 in the tested sample of reinforced tape 10 was easily seen in the tape 10 before the tape 10 was applied to a substrate, and that the scrim 18 became significantly less visible in the tape 10 when the tape 10 was adhered to the substrate, after which the scrim 18 was not easily visible, and the tape 10 was not easily visible on the substrate. This sample of the reinforced tape 10 provided a good balance between strength provided by the reinforcing scrim 18 and low visibility of the scrim 18 and of the tape 10 after the tape 10 was adhered to a substrate. Also, the reinforced tape 10 could be manually torn in straight directions either longitudinally or transversely with respect to the length of the tape 10.

For comparison the same test described above for determining RDLb and RDLa were performed on filament tapes that are commercially available from Minnesota Mining and Manufacturing Company, St. Paul, Minn., under the trade designations "897" and "898". The "897" filament tape had a 0.0016 inch or 0.004 cm thick elongate backing of visually transparent polyolefin, had longitudinally extending fiberglass reinforcing fibers along one side of the backing, which fibers were overlaid with visually transparent pressure sensitive adhesive. The individual fiberglass fibers of the "897" filament tape were about 1.05 denier in size, the fibers were in longitudinally extending bundles with the individual deniers of the fibers in each of the bundles totaling about 966, and there were about 14 of the longitudinally extending bundles per inch of width of the backing or about 5.7 of the longitudinally extending bundles per centimeter of width of the backing. The "898" filament tape had a 0.001 inch or 0.0025 cm thick elongate backing of visually transparent polyester, had longitudinally extending fiberglass reinforcing fibers along one side of the backing, which fibers were overlaid with visually transparent pressure sensitive adhesive. The individual fiberglass fibers of the "898" filament tape were about 0.6 denier in size, the fibers were in longitudinally extending bundles with the individual deniers of the fibers in each of the bundles totaling about 597 denier, and there were about 60 of the longitudinally extending bundles per inch of width of the backing or about 24 of the longitudinally extending bundles per centimeter of width of the backing. For the "897" filament tape the RDLb was found to be about 32.2% and the RDLa was found to be about 30.7% giving a reduction % of about 4.6%. For the "898" filament tape the RDLb was found to be about 19.0% and the RDLa was found to be about 17.1% giving a reduction % of about 10%. It was observed that the fiberglass fibers in the filament tapes were easily seen in the filament tapes both before and after the filament tapes were applied to a substrate.

Figure 5:
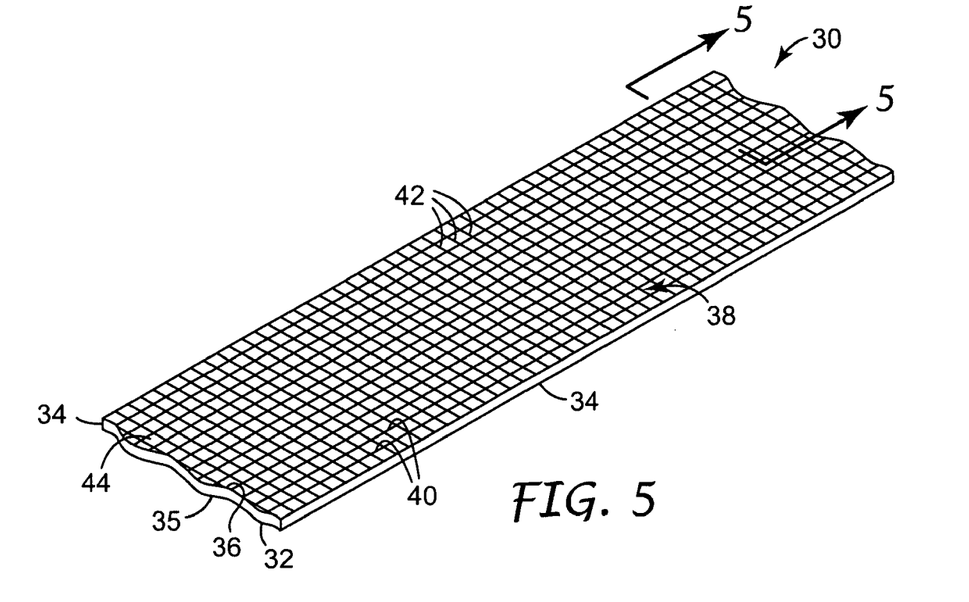
FIG. 5 is a perspective view of a second embodiment of transparent reinforced tape according to the present invention.
Figure 6:
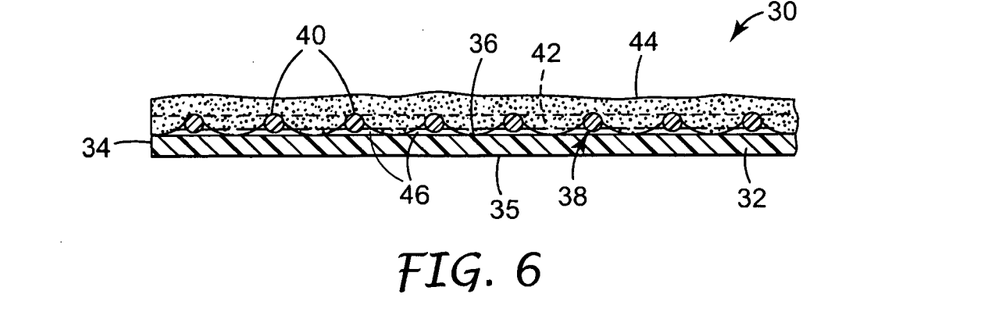
FIG. 6 is an enlarged fragmentary view taken approximately along the line 5—5 of FIG. 4.

Referring now to FIGS. 5 and 6 of the drawing, there is shown a second embodiment of a length of transparent reinforced tape according to the present invention generally designated by the reference numeral 30.

Generally, the length of reinforced tape 30 comprises an elongate visually transparent backing layer 32 of non-oriented polymeric material (e.g., a film of clear low density polyethylene) having opposite longitudinally extending edges 34 and opposite first and second major surfaces 35 and 36. A reinforcing scrim 38 extends along the second major surface 36 of the backing layer 32. That reinforcing scrim 38 is formed of fibers 40 (e.g., polyethylene fibers) that extend longitudinally along the backing layer 32 and are uniformly transversely spaced between the longitudinal edges 34 of the backing layer 32, and fibers 42 made of the same material that extend transverse of the backing layer 32 at right angles to its edges 34 and are uniformly spaced longitudinally along the backing layer 32. The transverse and longitudinally extending fibers 40 and 42 of the scrim 38 are fused together at their cross over points. Such a scrim is commercially available from "InterNet Incorporated", Minneapolis, Minn., as product number ON 2015 in which fibers of natural polypropylene weighing 4.5 pounds per 1000 square feet or 21.9 grams per 1000 square meter form ¼ inch or 0.63 cm square openings through the scrim. Another such scrim is also commercially available from "InterNet Incorporated" as product number ON 6275 in which fibers of natural polypropylene weighing 1.5 pounds per 1000 square feet or 7.3 grams per 1000 square meters form ⅙ inch or 0.42 cm square openings through the scrim. The length of reinforced tape 30 also includes a layer 44 of adhesive that is transparent when adhered between substrates, which layer 44 of adhesive is along the second major surface 36 of the backing layer 32 and covers the reinforcing scrim 38. The scrim 38 is only partially wetted by the adhesive (i.e., surface portions of the fibers 40 and 42 in the scrim 38 adjacent the backing layer 32 are not totally wetted, leaving air spaces 46 between the scrim 38 and the backing layer 32) so that those non-wetted portions of the surface of the scrim 38 adjacent the backing layer 32 scatter light and make the scrim 38 visible along the backing layer 32 to give a user of the reinforcing tape 30 visual assurance of its strength. The material from which the fibers in the scrim 38 are formed and the layer 44 of transparent adhesive have similar indexes of refraction, however, (e.g., an index of refraction for the material of the fibers in the scrim 38 that is within plus or minus 0.2 of the index of refraction of the adhesive in the layer 44 of transparent adhesive), and the fibers in the scrim 38 are sized (e.g., the deniers of the fibers in the scrim are less than about 300 denier) and are disposed so that upon applying force to the backing layer 32, as with ones hand, to press the layer 44 of adhesive against a substrate, the adhesive in the layer 44 will sufficiently wet the surfaces of the fibers 40 and 42 in the reinforcing scrim 38 to cause them to become significantly less visible than they were before the reinforced tape 30 was adhered to that substrate, so that the length of reinforced tape 30 becomes significantly more visually transparent after it is adhered to that substrate than it was before it was adhered to that substrate. The reinforced tape 30 could be manually torn in straight directions either longitudinally or transversely with respect to the length of the tape 30, such tearing being more easily done when the reinforcing scrim 38 was the product number ON 6275 from "InterNet Incorporated".

A reinforced tape can be made that has the structure described above with reference to FIGS. 5 and 6 except that instead of one of the scrims 38 from "InterNet Incorporated", a scrim is used that is commercially available from "Amoco Nisseki CLAF Inc.", Atlanta, Ga., as product number Claf S1501. That scrim is formed from flattened fused together fibers of polyethylene in two overlaid non aligned rectangular patterns to form irregular openings through the scrim, and weighs 0.68 ounce per square yard or 23.1 grams per square meter. The scrim is only partially wetted by the adhesive (i.e., surface portions of the flattened fibers in the scrim adjacent the backing layer are not totally wetted, leaving air spaces between the scrim and the backing layer) so that those non-wetted portions of the surface of the scrim adjacent the backing layer scatter light and make the scrim visible along the backing layer to give a user of the reinforcing tape visual assurance of its strength. The visually transparent material from which the fibers in the scrim are formed and the layer of transparent adhesive have similar indexes of refraction, however, (e.g., an index of refraction for the material of the fibers in the scrim that is within plus or minus 0.2 of the index of refraction of the adhesive in the layer of transparent adhesive), and the fibers in the scrim are sized and are disposed so that upon applying force to the backing layer, as with ones hand, to press the layer of adhesive against a substrate, the adhesive in the layer will sufficiently wet the surfaces of the fibers in the reinforcing scrim to cause them to become significantly less visible than they were before the reinforced tape was adhered to that substrate, so that the length of reinforced tape becomes significantly more visually transparent after it is adhered to that substrate than it was before it was adhered to that substrate. Reinforced tape made using product number Claf S1501 from "Amoco Nisseki CLAF Inc." was quite strong, but could not be manually torn in any direction.

Figure 7:
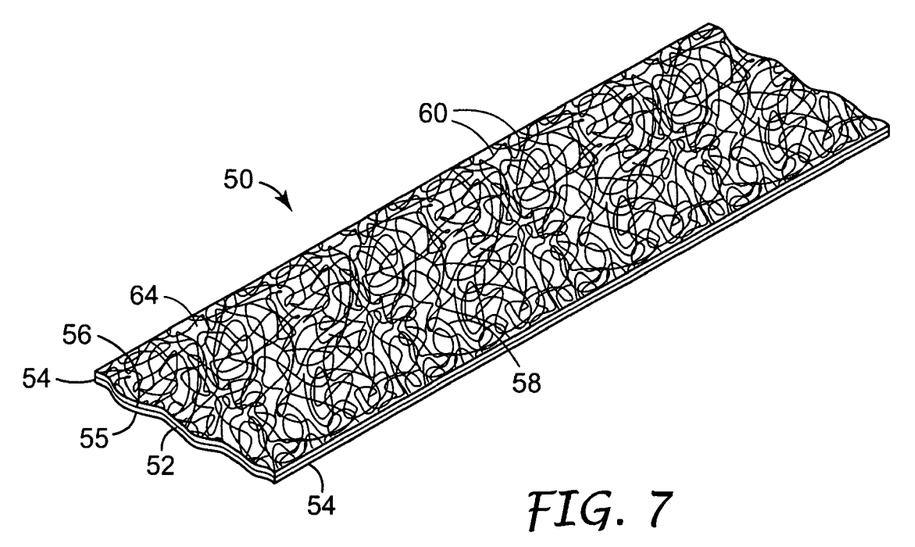
FIG. 7 is a perspective view of a third embodiment of transparent reinforced tape according to the present invention.

Referring now to FIG. 7 of the drawing, there is shown a length of transparent reinforced tape according to the present invention generally designated by the reference numeral 50.

Generally, the length of reinforced tape 50 comprises an elongate visually transparent backing layer 52 of polymeric material (e.g., a film of clear low density polyethylene) having opposite longitudinally extending edges 54 and opposite first and second major surfaces 55 and 56. A reinforcing scrim 58 extends along the second major surface 56 of the backing layer 52. That reinforcing scrim 58 is a non-woven layer of fibers 60 made of visually transparent material (e.g., fiberglass, acetate, acrylic, modacrylics, rayon, cotton, polyethylene, polypropylene, nylon, polyester, polyamine, or Kevlar). The length of reinforced tape 50 also includes a layer 64 of adhesive that is transparent when adhered between substrates, which layer 64 of adhesive is along the second major surface 56 of the backing layer 52 and covers the reinforcing scrim 58. The scrim 58 is only partially wetted by the adhesive in the layer 64 (i.e., surface portions of some of the fibers 60 in the scrim 58 adjacent the backing layer 52 are not totally wetted, leaving air spaces around those fibers and between the fibers 60 and the backing layer 52) so that the non-wetted surfaces of the fibers 60 in the scrim 58 scatter light and are visible along the backing layer 52 allowing a user of the reinforcing tape 50 to see the scrim 58 before the tape 50 is adhered to a substrate to give that user visual assurance of its strength. The visually transparent material from which the fibers 60 in the scrim 58 are formed and the layer 64 of transparent adhesive have similar indexes of refraction, however, (e.g., an index of refraction for the material of the fibers in the scrim 58 that is within plus or minus 0.2 of the index of refraction of the adhesive in the layer 64 of transparent adhesive), and the fibers 60 in the scrim 58 are sized (e.g., the deniers of the fibers in the scrim are less than about 300 denier) and are disposed so that upon applying force to the backing layer 52, as with ones hand, to press the layer 64 of adhesive against a substrate, the adhesive in the layer 64 will sufficiently wet the surfaces of the fibers 60 in the reinforcing scrim 58 to cause them to become significantly less visible than they were before the reinforced tape 50 was adhered to the substrate, so that the length of reinforced tape 50 becomes significantly more visually transparent after it is adhered to the substrate than it was before it was adhered to the substrate. A slightly thicker layer 64 of adhesive may be required than was used in the other embodiments of the reinforced tape described above to fully wet randomly occurring stacks of fibers 60 at fiber cross over points along the scrim when the reinforced tape 50 is adhered to a substrate. Because the scrim 58 is a non-woven layer of fibers 60, the reinforced tape can not be manually torn in a straight direction.

A very small amount of coloring (e.g., gray or red coloring) may optionally be included in the backing layer and/or the scrim and/or the layer of adhesive in any of the embodiments of the reinforced tape described above. That coloring, which is provided in an amount so small that it is very difficult to visibly detect in a single layer of the reinforced tape, can give an overall color to a roll of the tape which may be desirable for some purposes.

The present invention has now been described with reference to three embodiments and modifications thereof. It will be apparent to those skilled in the art that many changes can be made in the embodiment described without departing from the scope of the present invention. Thus, the scope of the present invention should not be limited to the structures described in this application, but only by the structures described by the language of the claims and the equivalents thereof.

What is claimed is:

1. A length of reinforced tape comprising:
    an elongate visually transparent backing layer of polymeric material having opposite longitudinally extending edges and opposite first and second major surfaces;
    a reinforcing scrim along the second major surface of said backing layer, said reinforcing scrim being formed of fibers; and
    a layer of visually transparent adhesive along said second major surface of said backing layer and covering said reinforcing scrim with only portions of said reinforcing scrim being wetted by the adhesive so that the reinforcing scrim is visible along the backing layer;
    said polymeric fibers and said transparent adhesive having similar indexes of refraction so that upon applying force to the backing to press the layer of adhesive against a substrate the layer of adhesive will wet the fibers, causing the reinforcing scrim to become significantly less visible than before the reinforced tape was adhered to the substrate.

2. A length of reinforced tape according to claim 1 wherein said reinforcing scrim is formed of bundles of said fibers extending longitudinally along said backing layer and being uniformly transversely spaced between the longitudinal edges of said backing layer, and bundles of said fibers extending transverse of said backing layer and being uniformly spaced longitudinally along said backing layer.

3. A length of reinforced tape according to claim 2 where the total of the individual deniers of the fibers in said bundles of fibers is less than about 300.

4. A length of reinforced tape according to claim 2 wherein the fibers are loosely laid in said bundles of fibers.

5. A length of reinforced tape according to claim 2 wherein said reinforced tape can be torn by hand both longitudinally along said backing layer and transverse of said backing layer.

6. A length of reinforced tape according to claim 1 where the index of refraction of the material of the fibers is within plus or minus 0.2 of the index of refraction of the adhesive.

7. A length of reinforced tape according to claim 1 where the material of the fibers is selected from the materials consisting of fiberglass, acetate, acrylic, modacrylics, rayon, cotton, polyethylene, polypropylene, nylon, polyester, polyamine, and Kevlar.

8. A length of reinforced tape according to claim 1 wherein some of said fibers in said reinforcing scrim extend longitudinally along said backing layer and are uniformly transversely spaced between the longitudinal edges of said backing layer, and some of said fibers in said reinforcing scrim extend transverse of said backing and are uniformly spaced longitudinally along said backing layer.

9. A length of reinforced tape according to claim 8 wherein said fibers in said reinforcing scrim extending longitudinally along said backing layer and said fibers in said reinforcing scrim extending transverse of said backing are fused together where they cross each other.

10. A length of reinforced tape according to claim 1 wherein said reinforcing scrim is a non-woven layer of said fibers.

11. A length of reinforced tape according to claim 1 wherein, when tested in accordance with the test described in this application, the percentage of light reflected from the tape as diffuse light was at least 15% before the tape was adhered to a substrate, and was reduced by at least 10% by adhering the tape to a substrate.

12. A length of reinforced tape according to claim 1 wherein, when tested in accordance with the test described in this application, the percentage of light reflected from the tape as diffuse light was at least 15% before the tape was adhered to a substrate, and was reduced by at least 60% by adhering the tape to a substrate.

* * * * *